(12) United States Patent
Anzani et al.

(10) Patent No.: US 6,503,355 B1
(45) Date of Patent: Jan. 7, 2003

(54) PROCESS FOR THE FORMATION OF VULCANIZED HOLLOW BODIES

(76) Inventors: Lanfranco Anzani, via Villoresi, 48 - Parabiago (Milan) (IT); Onorio Anzani, via Emanuele Filiberto, 7 - Parabiago (Milan) (IT); Gianfranco Roscini, via Martiri di Belfiore, 12 - Novara (IT)

( * ) Notice: Subject to any disclaimer, the term of this patent is extended or adjusted under 35 U.S.C. 154(b) by 0 days.

(21) Appl. No.: 09/492,621

(22) Filed: Jan. 27, 2000

(30) Foreign Application Priority Data

Feb. 3, 1999 (IT) .......................................... MI99A0200

(51) Int. Cl.⁷ .......................... B32B 31/00; B29C 49/22
(52) U.S. Cl. .......................... 156/145; 156/147; 264/512; 264/516; 264/545; 264/548; 264/549
(58) Field of Search ................................ 264/512, 516, 264/545, 548, 549; 156/145, 147

(56) References Cited

U.S. PATENT DOCUMENTS

| | | | |
|---|---|---|---|
| 1,575,388 A | * 3/1926 | Roberts | 156/145 |
| 2,364,029 A | 11/1944 | Ryan | |
| 3,825,457 A | * 7/1974 | Holroyd et al. | 156/147 |
| 3,933,967 A | * 1/1976 | Taylor | 264/248 |
| 4,722,131 A | * 2/1988 | Huang | 29/450 |
| 5,112,560 A | * 5/1992 | Moumdjian | 264/516 |
| 5,133,591 A | 7/1992 | Skaggs et al. | |
| 5,199,191 A | 4/1993 | Armenak | |
| 5,976,451 A | 11/1999 | Skaja et al. | 264/516 |
| 6,258,421 B1 | * 7/2001 | Potter | 428/35.2 |

FOREIGN PATENT DOCUMENTS

| | | |
|---|---|---|
| EP | 0215974 | 4/1987 |
| EP | 0745471 | 12/1996 |
| JP | 9239780 | 9/1997 |

* cited by examiner

*Primary Examiner*—Suzanne E. McDowell
(74) *Attorney, Agent, or Firm*—Bucknam & Archer (57) ABSTRACT

On the-inside of heated molds hollow bodies are formed by vulcanization, the bodies are formed of elements from natural or synthetic rubber and/or treated elastomers, possibly associated with different materials such as leather, skin, cotton, metals, expanded rubbers and others, combined with each other. A pressurized fluid, such as hot or cold air, vapor or compatible gas, is injected between the hollow bodies being formed. During vulcanization, the components, airtight-coupled with each other along at least a contact and sealing common line, are pushed and kept in forming adhesion against the mold surfaces by the pressurized fluid.

16 Claims, 4 Drawing Sheets

PROCESS FOR THE FORMATION OF VULCANIZED HOLLOW BODIES

BACKGROUND OF THE INVENTION

The invention relates to a process for the formation of vulcanized hollow bodies, and the hollow bodies so obtained. More particularly, the vulcanization of components from natural or synthetic rubber or elastomers, combined with each other and/or different materials such as leather, skin, cotton and/or metals, expanded rubbers and other materials takes place on the inside of heated molds. A pressurized fluid, such as hot or cold air, vapor or compatible gas is injected between said hollow bodies being formed. During vulcanization, the peripheral components, coupled with each other with airtightness along at least a common contact line, are pushed and kept in forming adhesion against the mold peripheral surfaces by the pressurized fluid. The process is carried out at temperatures preferably between about 100° C. and about 170° C., and at maximum pressures of the forming fluids of some bars, and is adoptable for the formation of any vulcanizable hollow components, such as for instance: tires and the like, seats, cushions, mattresses, products with sealed and independent zones, with different hardness, pressure and/or thickness, products for footwear in general, such as sandals, normal shoes, shoes with peripheral borders from rubber or other vulcanizable material, boots, slippers.

The process adopted by the known art for the production of vulcanized items, such as the parts of shoes and the like, are rather limiting. In fact, they allow to obtain, for instance, soles and/or arch-supports separate from each other, but not to obtain a combined formation of soles having intermediate chambers for air circulation. More precisely, in said vulcanization processes, the desired rubber composition obtained with a closed mixer, passes to an open mixer wherefrom the strip-cut sheets are conveyed to preforming machines that prepare the rubber pieces or the like in the desired size. The pieces are then arranged in the heated molds wherein they take on by means of presses the desired form by a vulcanization process. Rubber must remain in the molds for a given time, according to the type of rubber composition utilized and the thickness of the resulting products. The products obtained are single and compact, without the possibility of forming in them airtight- or air circulation chambers. Other problems arise from the fact that said processes require the use of large and very expensive presses, and the use of expensive steel molds for the forming process. The high cost of the steel molds is due, in particular, to the number of molds necessary to form, for instance a complete work set. Since each mold can be used only for an individual forming, with the ensuing need of having at hand as many molds as there are types of forming, design and thickness necessary for production. For other particular processes, such as for instance those relating to the application by vulcanization of peripheral borders on vamps already mounted on the respective shoe-trees and with the soles pre-assembled and already glued, it is at present necessary to have recourse to the use of an auto-clave, with consequent high plant and management costs.

SUMMARY OF THE INVENTION

An object of the present invention relates to a solution that eliminates the above drawbacks by adopting a process for the formation of vulcanized hollow bodies, and the hollow bodies obtained by such process, in order to achieve very significant results and advantages. More precisely, on the inside of the hollow bodies, zones, one or more chambers of any shape or development, airtight, independent or interconnected, subject to equal or differential pressures, are obtainable. The bodies may be circumscribed with materials having the same or a different firmness or hardness, according to specific local conditions. The vulcanization of the components, from natural or synthetic rubber or treated elastomers that may be combined with different materials such as leather, skin, cotton, metals, expanded rubbers or other compatible materials, is obtained in molds heated at temperatures comprised, for instance, between about 100° C. and about 170° C., wherein the forming element for obtaining the desired detail is a fluid, such as hot or cold air, vapor or other suitable gas, at an elevated pressure, for instance 3 to 6 bars, that is injected on the inside of said components intended for forming the hollow bodies. With said process it is possible to produce composite hollow bodies of any shape, with one or more internal chambers having different configurations and extensions and subject to different pressures, independently on the adopted and combined materials and the use requirements of said hollow bodies. Vulcanization does not require presses, as the molds, formed from half-molds closed and blocked with one another after the positioning therein of the pieces to be composed and vulcanized, can be made of a material sufficient to resist the closing loads and the pressure of the fluid injected inside, and capable of supporting contained temperatures, comprised for instance between about 100° C. and about 170° C., with thermal jumps between room temperature and maximum temperature, and vice-versa, obtained in sufficiently rapid times. The production cycle adopted for the process and the means necessary, such as molds, fluid injectors, injection valves, hot or cold air tunnel conveyors, are of a contained and economical cost.

The process also permits the forming of composite hollow bodies, suitably sized for special applications, with reduced working times and costs, and with a high yield. In particular and for instance, in the footwear industry, the simultaneous formation of soles having incorporated arch-supports, soles with air cushion and independent circulation arch-supports, of leather and/or cloth upper attachments, connections with stiffeners, of soles either made entirely from rubber or with leather insoles and heels, and other possibilities can be accomplished. The same system can be used to produce slippers, multi-color soles with or without internal air circulation or with discharge towards the outside, and also shoes with peripheral borders of rubber or other vulcanizable materials.

The technology characteristic of the present invention allows to obtain high reliability products with a versatile and economical process that ensures a reduction in machine and mold costs.

BRIEF DESCRIPTION OF THE DRAWINGS

The invention is described in the following with non-limiting examples of processes suitable to obtain vulcanized hollow bodies and of forms of said hollow bodies, referring to solutions adopted for footwear or other applications, with reference to the attached drawings wherein.

DETAILED DESCRIPTION OF THE INVENTION

In the process for the formation of vulcanized hollow bodies, the necessary rubber compositions are obtained in closed mixers, for instance of the Bambury type, passed afterwards to open mixers that convey the rubber compositions to calendars whereby continuous rolls are realized that have a pre-fixed weight, thickness and color. The individual details to be utilized for the formation of the products to be obtained are cut from said rolls. The various details are positioned in the de-coupled fixed and mobile half-molds according to the desired order and, with reference to FIG. 1 detail 1' relating to the formation of inserts included in sole 1, are placed and arranged, for instance, in the lower fixed half-mold 4, and 2' relating to the formation of arch-support 2 having holes for the injection of forming fluid, are placed and arranged, for instance, in the upper mobile half-mold 7, based on the intended and desired structure of the finished products.

Figure 1:
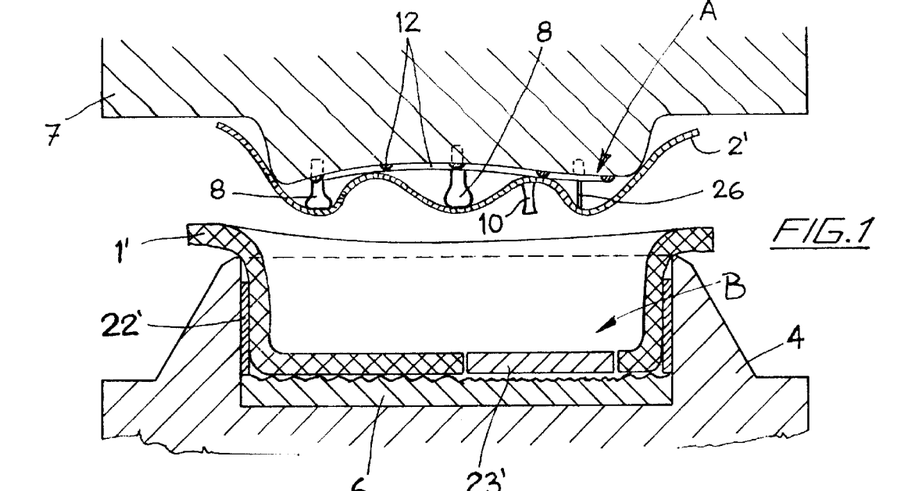
FIG. 1 is a cross-sectional view of a pair of associated half-molds, in the open position, with the details positioned and pre-molded, before the formation of a vulcanized hollow body for a sole-arch-support for shoes, with air circulation and pressurized-air-cushion arch-supports.
Figure 2:
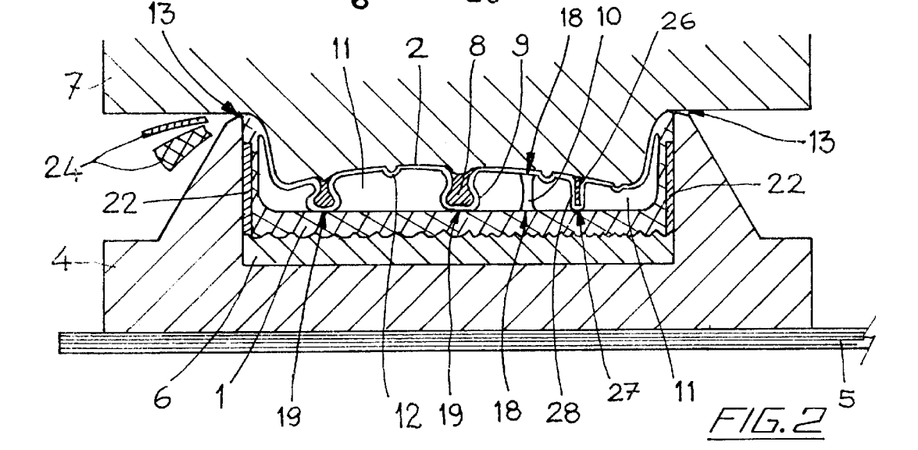
FIG. 2 is a cross-sectional view of the same pair of half-molds, coupled and closed for the formation of the vulcanized hollow body.

A preformation preparation of said parts on the decoupled half-molds is directly carried out, after which the half-molds are coupled, closed and blocked with each other. By means of injectors 14, applied for instance on the upper mobile half-mold, hot or cold air or vapor or even gas, at the pressure of some bars, is injected in the inside of the molds, in correspondence of a fixed point or points between the positioned details, with the purpose of causing internal thrusts and an adequate expansion that pushes said details until they touch and adhere to the corresponding peripheral walls of the molds, and against possible intermediate separations for the formation of walls 28 for airtight chambers 11, or air-circulation chambers. In any case, air, vapor or gas injected at the established pressure between said zones and/or chambers constitutes the means by which the final formation of the products are generated.

The coupling between the lower fixed half-mold 4 and the upper mobile half-mold 7 must be perfectly airtight, so as to ensure that the pressure of the injected fluid is constant for the whole duration of the vulcanization treatment. This can be accomplished either by adopting particularly accurate and configured techniques of construction of the half-mold borders, or by the insertion between the components to be airtight vulcanized (such as, for instance, crude rubber associated to shoe vamps and the bottom rubber composition of the corresponding soles) of closed-cell expanded rubber sheets that form gaskets suitable to make up for possible thickness differences of the materials which the vamps and their various coupling zones are made from. In the mold closing stage, the possible excess material 24 that juts out from the coupling perimeter 13 of the two coupled half-molds, and therefore of the products being formed, is removed, with the possibility of sending it to recycling and recovery of working wastes, with an ensuing reduction in production costs.

The closed molds are then sent, for instance by means of conveyor belts 5 or other adequate means, to heating stations, such as, for instance, heating plates, autoclaves, traditional or microwave ovens, or also electric resistors prearranged in said half-molds, wherein temperature, controlled by sensors, is increased to values comprised between about 100° C. and 170° C. Heating causes the vulcanization of the coupled parts which are natural or synthetic rubber and/or treated elastomers which at least the external surface details of the products being formed are made from, and the union and the cross-linking of rubbers with the possible different materials, which other details are made from. The possible use of hot injection fluids further facilitates the vulcanization of the parts, from the inside of the hollow bodies being formed, reducing the working time of the treatment.

After the vulcanization treatment, mold cooling zones are provided, that use cold water or air. Afterwards, the injection fluid is discharged, the molds are opend and the finished products extracted. The open molds are then repositioned for new and sequential working cycles, while in the recesses of the vulcanized bodies the atmospheric pressure is maintained by adequately plugging in the injection holes of the fluid let in by means of elastic stoppers or adhesives (50), or and if necessary, air or gas or compatible fluids are introduced by means of a syringe through said stoppers or adhesives, at a pressure higher by some tenths than room pressure.

In order to economically rationalize the process, the production cycle may be subdivided into distinct mold series, arranged to simultaneously realize closed cycle sequential working steps, thereby reducing substantially to zero the intermediate dead times. In this way, when a mold series is sent to the heating-vulcanization treatment, a second, already treated series is positioned in a cooling zone, while a third already cooled series is positioned in a zone of extraction of the finished products to be controlled, finished, trimmed, cleaned and packed. A fourth mold series, already free from finished products, is positioned in the zone wherein the operations of assembly of the various components, closing and blocking, application of the pressurized fluid, and preparation for the sending to the heating-vulcanization treatment, are carried out.

In FIGS. 1–9, reference is made to vulcanized hollow bodies for shoes; in particular to sole-arch supports with air space chambers and with independent air circulation. They are formed with surfaces from natural or synthetic rubber or with other suitable materials, such as treated elastomers and the like, vulcanized with each other. The lower parts, or sole 1, may be of one or more colors, with zones having different hardness or density or also, and possibly, of a weight similar to or lower than that of the soles of conventional shoes, while the upper parts, or arch-supports 2, have a softer structure and may also be covered with leather 3, imitation leather and/or natural or synthetic fabric. On the lower fixed half-mold 4, mounted on conveyor means 5, an impression may be provided that corresponds to the form of a sole. In the lower part, base plate 6, either interchangeable or fixed, may be inserted, on which different sole patterns are sculpted, for different types of shoes. On the upper mobile half-mold 7 the profile of at least an arch-support 2 is raised, and corresponds to the anatomical form of a foot sole, on which the possible protruding peduncles 8 are positioned and which are suitable to generate, during the fluid pressure molding, bellows 9 for the independent air circulation.

Spacing pegs 10, provided in the inside of the air-tight chambers to better support and/or distribute the body weight on the arch-supports, are positioned after the preforming step, exploiting the natural adhesion of the material layer 1' of sole 1, or the material layer 2' of the arch-support 2. Pegs are attached by self-adhesion to the material layer 2', as shown in FIG. 1, or on the surface of the material layer 1'. Bellows 9 may instead be combined with, or replaced by reticular channels 12, distributed on the external surface of arch-support 2. The sealing between the two coupled parts, i.e., sole 1 and arch-support 2, is realized along the edge of mutual touch 13, in correspondence of which vulcanization takes place. On the upper mobile half-mold 7 injectors 14 are present for the introduction of compressed air or gas between the aforementioned components 1 and 2, necessary for forming airtight chambers 11 and the whole sole-arch support assembly by effect of the thrust of the surface peripheral parts of the components adhering on the peripheral surfaces of the impressions of the coupled half-molds. Wall 28 separating or circumscribing airtight chambers 11 may be obtained by means of the insertions 25 (FIG. 8), formed of closed or open cell non-porouss material, located between the half-molds 4 and 7, before their air-airtight coupling and blocking, utilizing, for instance, foils 26 (FIGS. 1 and 2) hanging from one of the half-molds, in particular from the upper mobile mold 7, on which strips of material 2' fold, pushed against the same by the pressure of the compressed air, vapor or gas.

In both cases, ends 27 connect with the parts that constitute sole 1 and arch-support 2, during the action by the compressed air, vapor or gas, and the subsequent vulcanization.

The process and the combination of the parts in the molds are very versatile and allow the widest range of applications and formations, in a rapid and simple manner, and to contained costs. Air, vapor or gas injected between the two parts 1 and 2 coupled and airtight-connected by means of vulcanization is pressurized to a pressure higher than that of the atmosphere, with values that can be in the order of some bars. Instead of air and/or vapor, also other gases or fluids may be used, compatible with the products of natural and/or synthetic rubber or others to be vulcanized with each other. The products that are obtained may be either complete, as has been indicated above, or made up of separate pieces. For instance, there may be obtained heel-arch support-toe caps, heel-toe caps, arch supports with air space chambers without a sole, and the like. Instead of airtight chambers 11, there may be formed equal chambers wherein, during assembly of the components before preforming the process, inserts 15 of more or less elastic materials may be positioned, depending on their specific function. In said assemblies, either recombined or not combined with airtight chambers 11, reticular channels 12 may be formed that have different shapes and size, or bellows 9 may be formed. Both the channels and the bellows may have different size and be independent of airtight chambers. Those that are independent of the rest of the sole-arch support are in communication with the outside of shoes through holes 17 formed on the upper covers 3 of the arch-suport. Channels 12 distribute the moved air across the surface of the foot sole, in the inside of the shoe. The system allows a recirculation of air only in the inside of the shoe, or on the outside and in the inside, and vice-versa, as described in the following.

On the upper part of arch-support 2 sanitizing sole 3 is positionable, said insole being formed from leather, cotton or other materials, with holes 17 corresponding to the upper vent openings 16 of bellows 9 or the recticular channels 12. Insole 3 rests on, with the possibility of being extracted for possible washing, or is directly glued or tied to the arch-support 2 during sole vulcanization 1.

Once the shoes are finished and put on, the airtight chambers 11 and/or inserts 15, formed or arranged in the sole-arch-support assembly, cause the elastic deformation of the arch-support 2 and the corresponding sanitizing insole 3, and their adhesion to the sole profile of the wearer's feet, totally conforming to the form of the feet independently of whether they are normal, flat or have irregularities, such as calluses, hard skin or deformations. As a consequence, the feet do not have to adapt to the shoes, but rather the shoes adapt to the feet, much in the same way as the adaptation of sand when one walks barefoot on it, with ensuing and advantageous walking manner, according to the criteria often suggested by modern medicine when one has deambulation problems. Besides, the arch-support 2 that perfectly adheres to any foot form, causes the shoe to be put on with the same comfort and same advantages as shoes made to measure, for each type of foot and each type of deambulation. At every step, one foot compresses alternatively the back part of an arch-support 2, while the other foot compresses the front part of an arch-support 2, causing alternating local pressure variations, with the corresponding flattening and raising. These variations cause the fluid or the inserts to shift forwards and backwards, while arch-supports remain always adhering to the foot sole. In this way, forces are created that act on the soles of the feet like waves that create a sole massage that advantageously helps blood circulation. The expansions of airtight chamber (11), produced by pressure variations caused by walking, have a height that is limited by the shape of the arch-support 2, by means of the supporting pegs 10 and bellows 9. They are distributed in prefixed points of the foot sole and connect with one another the two opposite surfaces of the arch-support 2 and sole 1. During vulcanization, pegs and bellows, also from natural and/or synthetic rubber or from treated elastomers, join at the end points 18 and 19 with said arch-support 2 and sole 1.

Depending on the application, such as those for sports-shoes or special shoes, the internal pressure of airtight chambers 11 may be equal or differentiated, according to the position of said chambers, their extension or their function. In the presence of bellows 9 or reticular channels 12, the point-heel, heel-point walk exercises a compression and expansion action, independently of the airtight chambers 11, that expels and draws an amount of air through the vent holes 16. There is generated in this way a ventilation that produces a beneficial air change in the inside of the shoes at the point of contact with the feet. The air change keeps the feet dry and prevents the generation of an excess of perspiration and the ensuring emission of bad smells. Air circulation may also be activated from the outside towards the inside of the shoes, through special aspiration and repulsion holes 20, with or without valves, obtained along the external edges 21 of the soles that communicate with internal air spaces 47. In any case and at each moment, the body weight is always distributed on the surface of the feet in a correct manner, with the ensuing and known physical benefits.

In the formation of the sole-arch support assembly, it is also possible to apply decorative or reinforcing peripheral edges 22, by arranging strips 22' from a suitable, vulcanizable material along the perimetric profile of sole 1 as a first element positioned in the de-coupled fixed and/or mobile half-molds, according to the sequences desired. Such solution is advantageous as it is possible to make such applications, as has already been said, without having recourse to an autoclave, as happens now in the known, all the same valid, present processes. In fact, in the process of the present invention, the peripheral edge 22 are formed together with the sole and the vamp (FIGS. 1 and 6) with only one operation during the air, vapor or gas pressure action of some bars, with the vulcanization carried out at temperatures in the range from about 100° C. to about 170° C., depending on the working materials.

Also on the bottom of the sole, different inserts may be applied, such as color parts or also different patterns and profiles. This is obtained by placing and composing on said bottoms the above inserts, pre-cut in the desired shape, profile and extension, in correspondence of the respective windows, profiled and opened in the sole. The inserts must be of prefixed thickness or possibly they may cover also the edges, so that, once the vulcanization is completed, they are integral with the sole.

In a manner substantially similar to the one just described, it is also possible to realize the arch-supports with airtight chambers 11 and/or 12 with bellows 9 and/or reticular channels 12, separate from sole 1, and that can be inserted in traditional footwear. In this case, as a replacement for the sole, a layer from thinner and more flexible material (1) of the type adopted for the formation of layer 2 will be used. With the same technique and utilizing the same molds, products can be formed that have the most various internal structures.

Figure 3:
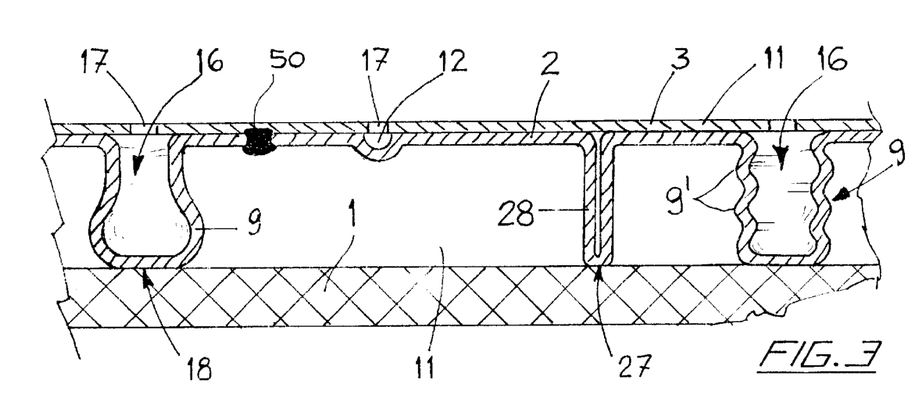
FIG. 3 is an enlarged cross-sectional view of a part of a hollow body with bellows, a channel and an airtight wall.

FIG. 3 shows different types of bellows 9. The profile of its section is specifically designed to obtain the best elasticity and flexibility, so as to ensure a very effective air aspiration and pumping action during walking movements. The extraction of pegs 8 from bellows 9 at the end of the formation, is in any case facilitated by the elasticity of the rubbery material that constitutes the arch-support 2, independently of the presence of one or more bends or undulations 9'.

Figure 4:
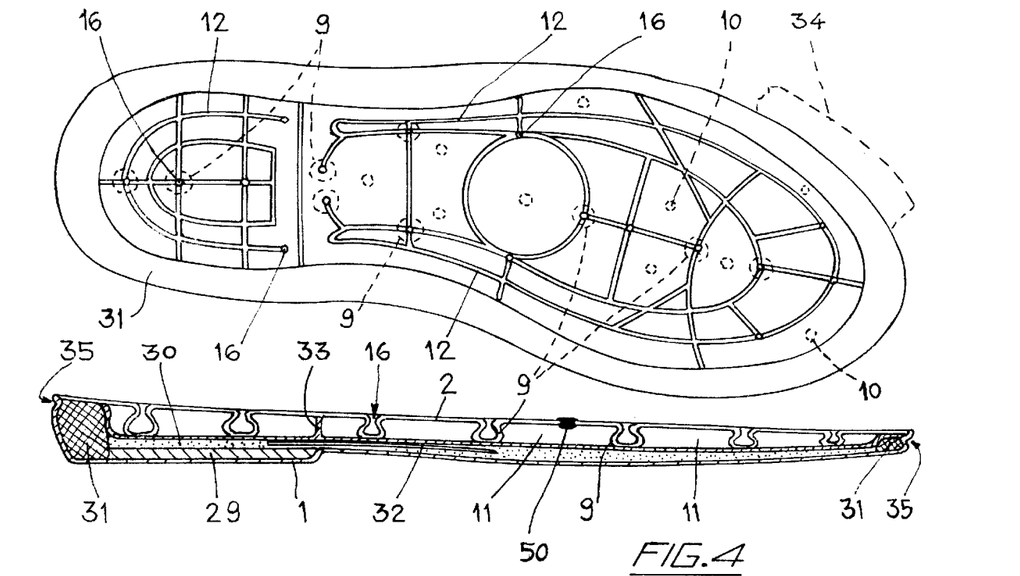
FIG. 4 is a plan view and a cross-sectional view of another example of a vulcanized composite hollow body, for the formation of an air-circulation arch-support for footwear.

In FIG. 4, sole 1 comprises an internal stratification 29 from rigid material, in correspondence of the heel, an intermediate stratification 30 from semi-elastic material extended into the central sole zone, a peripheral insulating zone 31 constituted by rubber, expanded rubber or the like, and a metal plate or stiffener 32, together with airtight chambers 11 and bellows 9, combined with the reticular channels 12 formed above the arch-suuport 2. The heel and sole are separated by a transversal wall 33, while the arch-support 2 may comprise a perimetric integral extension 34 whose function is to connect with the shoe vamp 37. As an alternative, said connection may be independent, and the connection with the sole may be through a traditional peripheral seam along the preformed edge 35.

Figure 5:
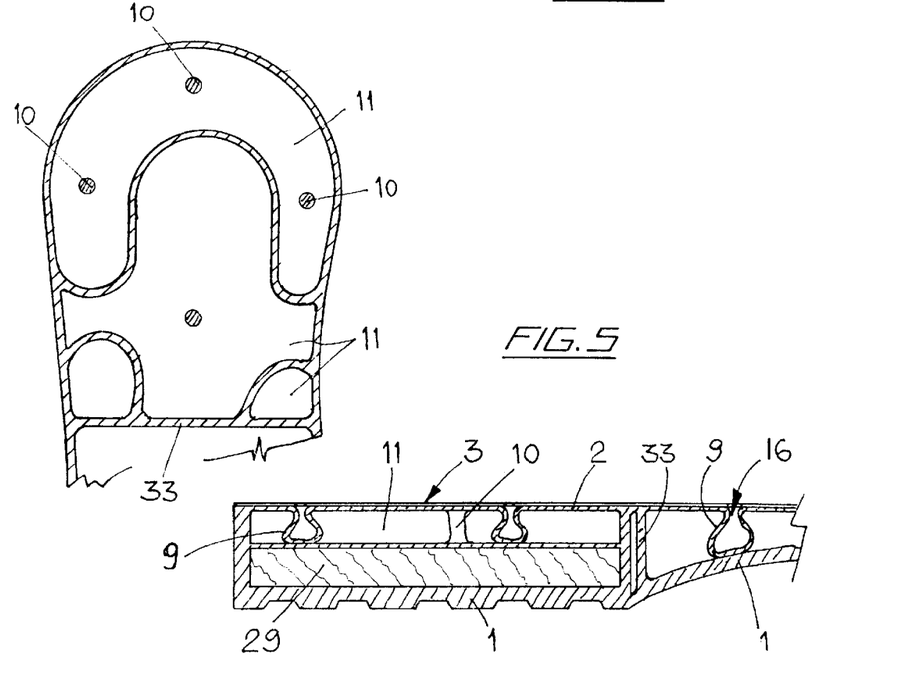
FIG. 5 is a plan view with a longitudinal cross-sectional view of a heel for sole-arch support assemblies having air cushion zones, a circulation system and inserts.

FIG. 5 shows the airtight chambers 11, provided with supporting spacing pegs 10, and the stratifications with different materials of the heel zone.

Figure 6:
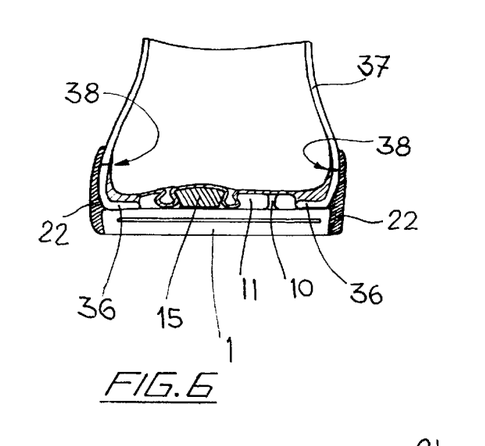
FIG. 6 is a cross-sectional view of a composite sole formation, with inner inserts wherein also the vamp is connected and wherein a peripheral border is included.

The section of FIG. 6 shows the combined vulcanization connection between sole 1 and arch-support 2, with the interposition of the peripheral edge 36 of vamp 37, and the point where said vamp is also possibly sewn to the upper edge of the arch-support 2 and the possible peripheral edge 22, through a seam 38.

Figure 8:
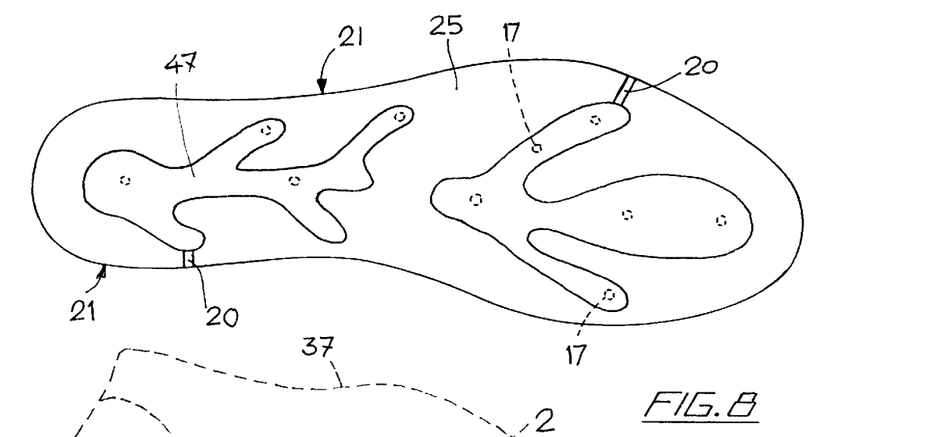
FIG. 8 is a plan view and a partial prospect of other shapes of composite soles.

FIG. 8 shows some examples of airtight-chambers 11 and of chambers for circulation air activated from the outside to the inside of the shoes through special aspiration and expulsion holes 20, with or without valves, formed along the external edges 21 of the soles.

Figures 9, 10, 11, 12:
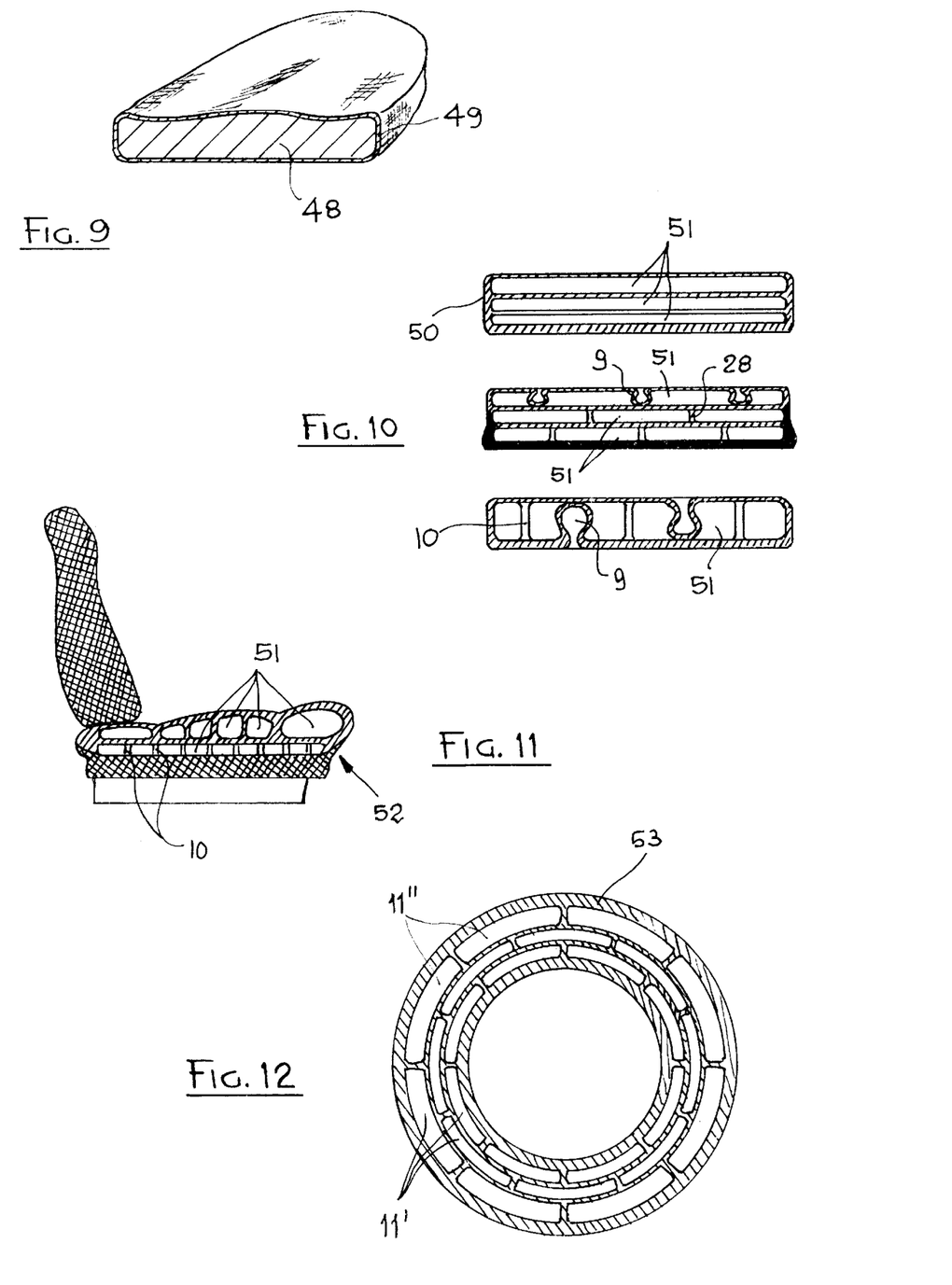
FIG. 9 is a cross-sectional view of a sandal sole with the related leather covering.
FIG. 10 shows cross sectional views of examples of vulcanized hollow bodies with several superposed layers, for cushions or other applications.
FIG. 11 is a cross-sectional view of a seat for motor-cars, formed with vulcanized bodies.
FIG. 12 is a cross-sectional view of a vulcanized annular crown hollow body with a circular ovoid cross-section, such as a tire.

FIG. 9 shows that the sole-arch support assembly 48, whatever its internal structure may be, with or without airtight chambers 11, with or without bellows 9, with or without layers having a different consistency according to what has been described above, is entirely coated with a surface layer from natural or synthetic leather 49. The indissoluble integration of the parts takes place by impregnation of the leather pores with the rubbery particles of the underlying layers, during the vulcanization stage and the possible injection of compressed air, vapor or gas.

Figure 7:
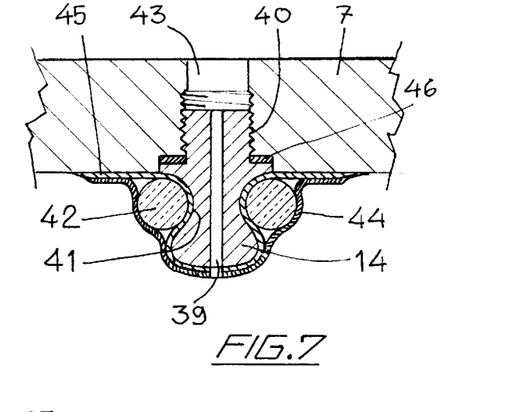
FIG. 7 is a cross-sectional view of a valve type suitable for the injection of pressurized air, vapor or gas.

FIG. 7 shows a section of a type of injector for the air or gas for the formation of the hollow bodies. The injector has a central hole 39, a threaded tang 40 and a peripheral shaping 41 whereon an OR gasket 42 is contained. Tang 40 is screwed on one of the connections 43, corresponding to the selected injection zone. Preferably, the connections are present on the surface of the upper half-mold 7, they are in a defined number and are positioned at strategic points, based on the number of molds and products to be formed. Usually, they are plugged and opened only to be connected to the distribution source of pressurized air, vapor or gas when it is necessary, or only when the use of injectors 14 is required in correspondence of one or more thereof. The sealing of each injector 14-connection 43 coupling is obtained by means of rubber gaskets 44 and 45, that are surface-adhering to allow the interconnection and adherence with the surfaces of the half-molds, combined with the OR gasket 42 and possibly of traditional sealing means 46. Injectors 14 may be provided with a non-return ball valve, a reaction spring or the like.

The three last figures represent other examples of vulcanized hollow bodies obtained with the process of this invention, for applications other than footwear.

FIGS. 10 and 11 refer to hollow bodies 50 with one or more internal superposed stratifications 51 having a same thickness or with injections of different pressure air, vapor and gas wherein there may be comprised or not comprised air circulation bellows 9, intermediate walls 28, or the like. Said bodies can be adopted for the constitution of various common and/or specific use items, such as for instance, cushions and/or mattresses both for traditional and medical use, padding, elastic spring-boards, seats for vehicles in general 52, ergonomic chairs or arm-chairs, and the like.

FIG. 12 refers, instead, to an example of hollow body 53 having a toroidal, circular shape, with a round or ovoid cross-section, suitable to constitute, for instance, vehicle tires. With the process of the present invention, it is possible to obtain the formation of tires complete with the necessary reinforcing nets applied as inserts, wherein there may also be provided distinct air spaces, either radial 11' with different pressure levels obtained by a syringe, or circumferential 11" with a constant pressure. The tires obtained are of the type without air space. Also in case of puncture, for instance of one of the outermost air spaces, the vehicles can proceed in an almost normal manner, thanks to the presence of the other air spaces 11", obtained on the same circumferential belt and in the presence of the subsequent circumferential chambers 11'", located more internally on subsequent and different circumferential stratifications possibly subjected to different pressures.

What is essential is that, with respect to the described work conditions, with pressures of some bars only (for instance, from 3 to about 6 bars) and changes in vulcanization temperature contained between room temperature and those ranging from about 100 to about 170° C., the half-molds 4 and 7 can advantageously be realized with less precious materials, easy to be worked and/or molded, and therefore less expensive. In particular, they may be realized from aluminum or also epoxy resins or the like, possibly with glass, aluminum, quartz flour fillers or the like. The only necessary conditions, on the other hand easily obtainable with the above materials, are those that ensure the resistance against the closing loads of the half-molds and the internal formation pressure, of a few bars only, and the capacity of supporting rapid thermal changes, comprised between room temperature and the indicated process temperatures, and vice-versa. Another advantage, that arises both from the low running conditions required and from the more economical and workable materials that can be used, is due to the fact that for particular conditions and specific realizations for the assembly of footwear with vamps mounted on respective shoe-trees to be applied to the corresponding soles, said shoe-trees, also made with the same less precious materials indicated above, are directly utilizable as upper half-molds 7 and coupleable with lower half-molds 4 for the formation of the soles, with possible and/or relating details combined according to what has been already described.

From the examples given in the description and the illustrations, from the forms and the characteristics of the products obtainable, it is easy to understand that the process of this invention is versatile and of easy execution, and allows the creation of vulcanized hollow bodies of any shape and internal structure, either for products of the same type obtainable, for instance, with the same mold or changing only the position of injectors 14 and/or pegs 8 and/or of some details, or for any other types of products, intended for the most various uses. And this in a simple, rapid and economical manner.

What is claimed is:

1. A process for the formation of vulcanized hollow bodies from vulcanizable materials having airtight or air circulating chambers (11) and including spacing pegs (10), bellows (9, 9'), reticular channels (12), airtight walls (28) and/or inserts (15), by introducing the various components or details (1',22',23',2') between a lower half-mold (4) and an upper half-mold (7) of a mold and the formed hollow body is then vulcanized, said process comprising:

a) providing upper half-mold (7) with protruding peduncles (8), foils (26) and/or means for forming reticular channels (12);
   b) positioning the details (1',22',23',2') on each surface of the lower half mold (4) and upper half-mold (7);
   c) preforming the details (1', 22',23',2') on the surface of the lower and upper half-molds (4,7);
   d) fixing spacing pegs (10) on the surface of one of the details (1',22',23',2') by adhesion, said spacing pegs (10) being arranged between the details carried by the upper and lower half-molds;
   e) coupling the lower and upper-half molds and airtight sealing along the edge of mutual touch (13) of the lower and the upper half-molds, the details of the one half-mold including the protruding peduncles (8) and foils (26) contacting the details of the other half-mold;
   f) injecting air or other fluid under pressure in the inside of the mold between the upper and lower details to form airtight chambers (11), separating walls (28) and reticular channels (12), and to press the respective. details positioned on each surface of the lower half-mold (4) and upper half-mold (7) against the respective half-mold surface;
   g) vulcanizing the formed hollow bodies by heating the mold at a temperature between 100 and 170° C.; and
   h) cooling the mold, opening the mold and extracting the formed vulcanized hollow body.

2. The process according to claim 1, wherein the air or other fluid is injected to a pressure of 3 to 6 Bars.

3. The process according to claim 1, wherein the hollow body is a shoe sole wherein the detail (1') relates to the formation of the sole, detail (22') relates to the formation of peripheral borders of the sole and detail (23') relates to the formation of inserts in the sole, said details being arranged in the lower half-mold (4), and detail (2') relates to the formation of an arch-support and is arranged in the upper half-mold (7).

4. The process according to claim 3, wherein detail (2') relating to the formation of an an arch-support is provided with openings for the injected air or other fluid.

5. The process according to claim 4, wherein following vulcanization, cooling of the mold and extraction of the hollow body, the air or fluid pressure inside the body is maintained by plugging the injection openings by stoppers or adhesives (50).

6. The process according to claim 1, wherein upper half-mold (7) is provided with injectors (14) for the air or other fluid under pressure.

7. The process according to claim 1, wherein the airtight sealing of the borders of the half-molds (4 and 7) is assured by interposing a closed-cell expanded rubber sheet at the edge of mutual touch (13) of the lower and upper half molds.

8. The process according to claim 1, wherein the closed mold is heated by heating plates, autoclaves, ovens, wave-ovens or electric resistors arranged in each of the upper and lower half molds.

9. The process according to claim 1, wherein the lower part of the hollow body is provided with one or more colors, zones with different hardness or density and/or with different weight.

10. The process according to claim 1, wherein the upper part or arch-support (2) of the hollow body has a softer structure than the lower part (1) or sole and, optionally, is covered with leather or fabric.

11. The process according to claim 1, wherein insertions (25) from closed or open cell non-porous material, stratification (30) from semi-elastic material, rubber insulating zone (31) and/or a metal plate (32) are located between the upper and lower half-molds before the coupling of said upper and lower half-molds.

12. The process according to claim 1, wherein said inserts (15) formed from elastic material are arranged between the upper and lower half-molds before the preforming step.

13. The process according to claim 1, which further comprises covering the upper detail (2') with a cover (3)

provided with through holes (7) corresponding to vent openings (16) of the bellows (9) or of the reticular channels (12).

14. The process according to claim 1, which further comprises providing an external edge (21) of the hollow body with holes (20) communicating with an internal air space (47).

15. The process according to claim 1, which further comprises arranging strips (22') of vulcanizable material in one of said upper and lower half-molds along the perimetric profile of the hollow body before the coupling of said upper and lower half-molds.

16. The process according to claim 1, which further comprises arranging inserts (23') of different color, pattern- or/and profile in corresponding- windows of the lower detail (1') before the coupling of the upper and lower half-molds.

* * * * *